(12) United States Patent
Böhm

(10) Patent No.: US 10,072,660 B2
(45) Date of Patent: Sep. 11, 2018

(54) PUMPING DEVICE FOR PUMPING OIL FROM A STORAGE CONTAINER TO A TRANSMISSION SYSTEM OF A MOTOR VEHICLE

(71) Applicant: CONTINENTAL AUTOMOTIVE GMBH, Hannover (DE)

(72) Inventor: Christian Böhm, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 522 days.

(21) Appl. No.: 14/351,363

(22) PCT Filed: Oct. 11, 2012

(86) PCT No.: PCT/EP2012/070210
§ 371 (c)(1),
(2) Date: Apr. 11, 2014

(87) PCT Pub. No.: WO2013/053854
PCT Pub. Date: Apr. 18, 2013

(65) Prior Publication Data
US 2014/0286801 A1   Sep. 25, 2014

(30) Foreign Application Priority Data

Oct. 14, 2011 (DE) .................. 10 2011 084 542

(51) Int. Cl.
*F04C 29/00* (2006.01)
*F04C 2/08* (2006.01)
(Continued)

(52) U.S. Cl.
CPC .......... *F04C 29/0085* (2013.01); *F04C 2/08* (2013.01); *F04C 2/344* (2013.01); *F04C 2/3446* (2013.01);
(Continued)

(58) Field of Classification Search
CPC ........ F04C 29/0085; F04C 2/08; F04C 2/344; F04C 2/3446; F04C 2/18; F04C 2/00;
(Continued)

(56) References Cited

U.S. PATENT DOCUMENTS

| 4,931,249 | A  | * | 6/1990 | Hune ...................... B29B 7/748 |
| | | | | 222/134 |
| 6,234,769 | B1 | * | 5/2001 | Sakai ................... F04B 27/0895 |
| | | | | 417/374 |
| 6,874,996 | B2 | | 4/2005 | Iwanami |
| 8,162,625 | B1 | * | 4/2012 | Soderstrom ......... F04C 15/0073 |
| | | | | 417/360 |

(Continued)

FOREIGN PATENT DOCUMENTS

| CN | 101147014 | 3/2008 |
| CN | 102128260 | 7/2011 |

(Continued)

OTHER PUBLICATIONS

"Definition—Shaft"—Mcgraw-Hill Dictionary of Engineering Second Edition.*

*Primary Examiner* — Devon Kramer
*Assistant Examiner* — Christopher Brunjes
(74) *Attorney, Agent, or Firm* — Cozen O'Connor

(57) ABSTRACT

A pumping device for pumping oil in a transmission system of a hybrid drive for a motor vehicle has an oil pump and a direct drive for driving the rotor and an electric drive for driving a rotor part that surrounds the rotor. A stationary housing surrounds the rotor part and has an inlet connection and an outlet connection of the oil pump. The oil pump allows a selective drive via the direct drive or the electric drive in a simple manner.

11 Claims, 4 Drawing Sheets

(51) Int. Cl.
*F04C 2/344* (2006.01)
*F16H 57/04* (2010.01)
*F16H 61/00* (2006.01)
*F04C 15/00* (2006.01)
*F04C 2/00* (2006.01)
*F04C 2/10* (2006.01)
*F04C 2/18* (2006.01)

(52) U.S. Cl.
CPC ....... *F04C 15/008* (2013.01); *F16H 57/0439* (2013.01); *F16H 61/0028* (2013.01); *F04C 2/00* (2013.01); *F04C 2/10* (2013.01); *F04C 2/18* (2013.01); *F04C 2240/402* (2013.01); *F04C 2240/45* (2013.01)

(58) Field of Classification Search
CPC ...... F04C 2/10; F04C 15/008; F04C 2240/45; F04C 2240/402; F04C 18/023; F04C 18/3442; F16H 61/0028; F16H 57/0439
USPC .......................... 417/220, 338, 362, 364, 374
See application file for complete search history.

(56) References Cited

U.S. PATENT DOCUMENTS

| | | | |
|---|---|---|---|
| 2003/0133809 A1* | 7/2003 | Iwanami | F04C 18/023 417/212 |
| 2003/0228237 A1* | 12/2003 | Holtzapple | F01C 1/10 418/171 |
| 2007/0231176 A1* | 10/2007 | Asai | F01C 21/02 418/61.2 |
| 2010/0018808 A1 | 1/2010 | Gloge | |
| 2010/0120569 A1* | 5/2010 | Sanji | B60K 6/26 475/5 |
| 2010/0130327 A1* | 5/2010 | Morgan, Jr. | F04C 2/102 477/5 |

FOREIGN PATENT DOCUMENTS

| | | | |
|---|---|---|---|
| DE | 10300683 | 7/2003 | |
| DE | 10329215 A1 | 1/2005 | |
| DE | 102006030041 | 1/2008 | |
| DE | 102006030041 A1 * | 1/2008 | ............ B60K 6/383 |

* cited by examiner

PUMPING DEVICE FOR PUMPING OIL FROM A STORAGE CONTAINER TO A TRANSMISSION SYSTEM OF A MOTOR VEHICLE

CROSS-REFERENCE TO RELATED APPLICATIONS

This is a U.S. national stage of application No. PCT/EP2012/070210, filed on 11 Oct. 2012, which claims priority to the German Application No. 10 2011 084 542.9, filed 14 Oct. 2011, the content of both incorporated herein by reference.

BACKGROUND OF THE INVENTION

1. Field of the Invention

The invention relates to a pumping device for pumping oil from a storage container to a transmission of a motor vehicle having an oil pump that can be driven optionally by a mechanical direct drive or by a switchable electric drive.

2. Related Art

Pumping devices of this type are used, in particular, in motor vehicles having a hybrid drive. In hybrid drives of this type, the oil pump for supplying a transmission is driven directly by the transmission. If the transmission is at a standstill, its function is to be maintained and the oil pump is therefore to remain in operation.

DE 103 29 215 A1 has disclosed a drive apparatus for a transmission oil pump, in which a single oil pump is driven optionally electrically or directly via a summing transmission. For this purpose, the summing transmission has two powertrains, it being possible for one powertrain to be driven by an internal combustion engine and for the other powertrain to be driven by an electric motor. The summing transmission is designed, for example, as a planetary gear mechanism. The advantage or this design consists in that only a single oil pump has to be used, in order to drive the oil pump optionally electrically or directly. However, the summing transmission leads to a high structural complexity.

SUMMARY OF THE INVENTION

An object of the present invention is directed to overcoming the problem of developing a pumping device of the type mentioned at the outset, in such a way that it is of particularly simple construction and can be produced inexpensively.

According to an aspect of the invention, this problem is solved by virtue of the fact that the oil pump has two components which can be moved relative to one another in order to pump the oil, and that the mechanical direct drive is connected to one of the two components and the switchable electric drive is connected to the other of the two components.

By way of this design, the different possibilities for driving the oil pump are solved by the corresponding design of the oil pump itself. The connection of a summing transmission upstream of the oil pump is therefore avoided. The pumping device according to an aspect of the invention is therefore of particularly simple construction and can be produced inexpensively. Furthermore, parallel operation of the direct drive and the electric drive is also conceivable if, for example, the electric drive is to be started prematurely before the direct drive is switched off. The pumping performance of the oil pump can likewise be raised by switching on of the electric drive if the direct drive runs at too low a rotational speed in an operating state.

The components that can be moved relative to one another could be, for example, two running wheels, which can be driven independently of one another and lie one above another in a sandwich-like manner. However, tibia leads to unnecessary structural complexity as a result of high dimensions. The structural complexity for forming the components that can be moved relative to one another can be kept low in a simple manner according to one advantageous aspect of the invention if the oil pump has a rotor part mounted rotatably with respect to a rotatable rotor, with oil feed elements for the rotor. As a result of this design, the rotor of the oil pump can be coupled to the direct drive and the rotor part of the oil pump can be coupled to the switchable electric drive. The opposite coupling is likewise possible.

According to another advantageous aspect of the invention, the oil pump is of structurally particularly simple design if the rotor part is mounted rotatably with respect to a stationary housing and is sealed by a radial seal, and if inlet and outlet connectors for the hydraulic connection of the oil pump are arranged on the housing.

The pumping device according to an aspect of the invention is of particularly compact design if the housing has a common recess for an electric motor of the electric drive and the rotor part and the rotor of the oil pump. Furthermore, as a result, the electric motor is cooled by the pumped oil and its noise is damped. Furthermore, as a result, the seal of a shaft leadthrough for the electric drive can be dispensed with.

According to another advantageous aspect of the invention, influencing of the electric drive by chemical or physical influences of the oil can be avoided simply if the housing has a first recess for the rotor part and the rotor of the oil pump and a second recess for the electric motor of the electric drive.

A drive torque provided during operation of the oil pump by the electric drive can be set simply according to another advantageous aspect of the invention if the electric drive has a step-down gear mechanism.

The rotor part could have, for example, a circulating annular gear, on which the respective drive is articulated. However, this leads to large dimensions and therefore to an increased structural complexity of the oil pump. According to another advantageous aspect of the invention, the oil pump is of particularly compact design if the rotor is fastened on a shaft and the rotor part is connected to a hallow shaft arranged concentrically with respect to the shaft. In a kinematic reversal, the rotor can also, according to another aspect, be arranged on the hollow shaft and the rotor part can be arranged on the shaft. The hollow shaft is preferably guided exclusively inside the housing, with the result that the seal of a shaft leadthrough is avoided, According to another advantageous aspect of the invention, the oil pump consists of particularly few components to be assembled if the rotor part is configured as an inner housing arranged inside the housing with a ring, which encloses the rotor radially and control plates that lie opposite the end sides of the rotor. The ring or the control plates preferably have the oil feed elements for the rotor.

According to another advantageous aspect of the invention, a contribution is made to the simplification of the structural complexity of the oil pump if inlet and outlet openings are arranged on the rotor part. The inlet and outlet openings therefore serve as oil feed elements for the rotor.

According to another advantageous aspect of the invention, axial inflow or throughflow of the oil pump can be achieved simply if at least one of the inlet and outlet openings is arranged on the control plates of the rotor part.

According to another advantageous aspect of the invention, radial outflow of the oil pump can be achieved if at least one of the inlet and outlet openings is arranged on the ring of the rotor part, which ring encloses the rotor.

According to another advantageous aspect of the invention, mutual influencing of the drives with respect to one another can be avoided simply if the direct drive and the electric drive are of self-locking design.

According to another advantageous aspect of the invention, the oil pump can he driven particularly advantageously by two different drives if the oil pump is configured as an annular gear pump, as a vane cell pump or as an external gear pump. In the case of pump principles of this type, the rotor of corresponding design and a ring that surrounds the rotor interact in such a way that optionally the ring or the rotor can be driven for pumping the oil in a particularly simple way.

BRIEF DESCRIPTION OF THE DRAWINGS

The invention permits numerous embodiments. For further clarification of its basic principle, a plurality of the embodiments are shown in the drawings and will be described in the following text. In the drawings.

DETAILED DESCRIPTION OF THE PRESENTLY PREFERRED EMBODIMENTS

Figure 1:
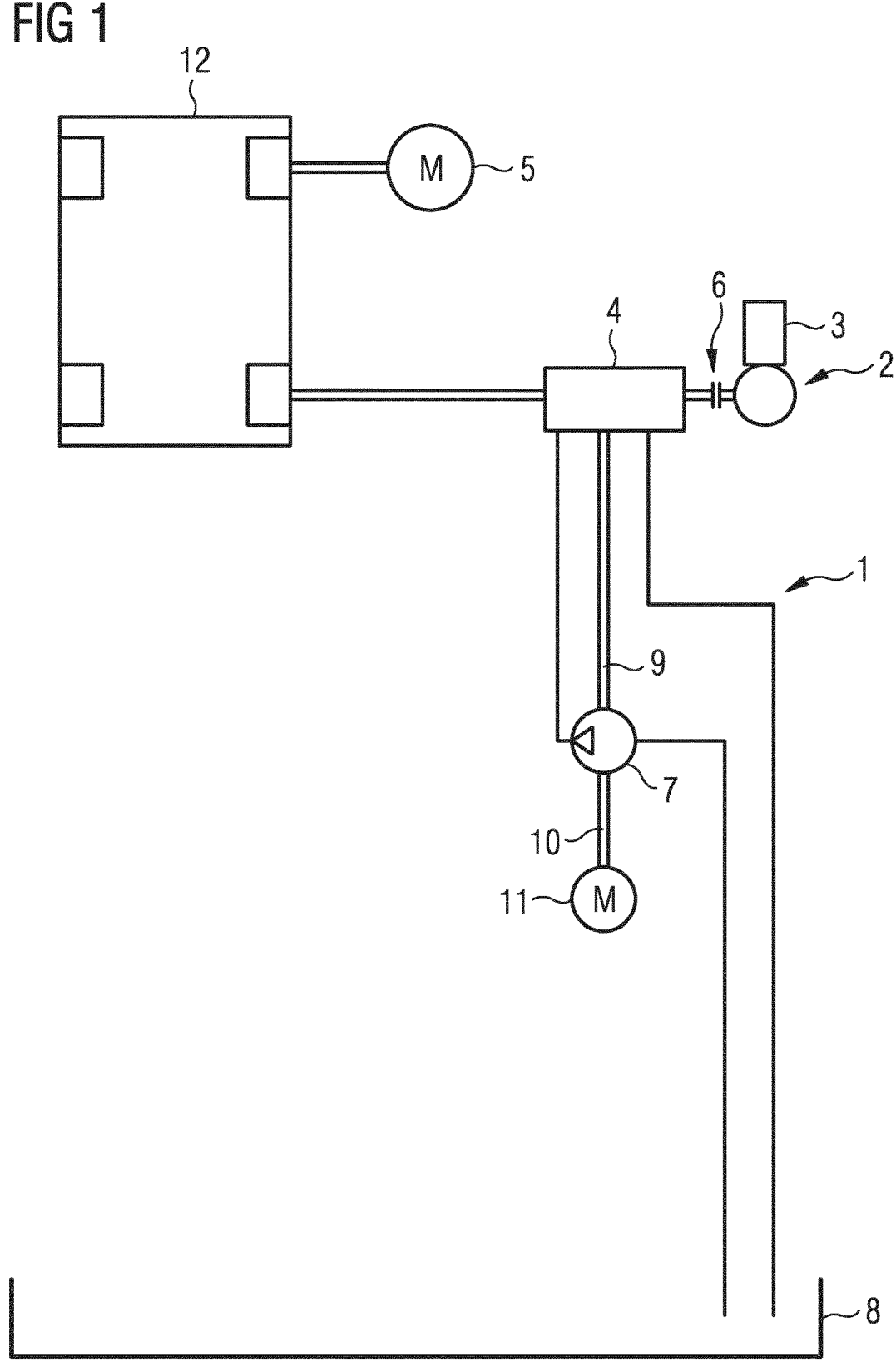
FIG. 1 diagrammatically shows a pumping device according to the invention with adjoining components of a motor vehicle.

FIG. 1 diagrammatically shows a pumping device 1 with components of a hybrid drive 2 of a diagrammatically shown motor vehicle 12. The hybrid drive 2 has an internal combustion engine 3 that drives the motor vehicle 12 via a transmission 4, and an electric drive unit 5 for driving the motor vehicle 12 independently of the transmission. A clutch 6 separates the internal combustion engine 3 from the transmission 4. The pumping device 1 has an oil pump 7 for supplying the transmission 4 with oil and a storage container 8, which is configured as an oil sump. Oil pumped by the oil pump 7 passes to the transmission 4 and from there back into the storage container 8 again.

The transmission 4 has a direct drive 9 for driving the oil pump 7. Furthermore, an electric drive 10 with an electric motor 11 is connected to the oil pump 7. The oil pump 7 can therefore be driven optionally via the electric drive 10 or via the direct drive 9. Parallel operation of the direct drive 9 and the electric drive 10 is also conceivable, in order, for example, to start up the electric drive 10 prematurely before switching off of the direct drive 9. In one operating mode of the motor vehicle 12, the electric drive unit 5 is switched on and the internal combustion engine 3 is switched off. In this case, the direct drive 9 of the transmission 4 is also switched off. In this operating mode of the motor vehicle 12, the oil pump 7 is driven via the electric drive 10.

Figure 2:
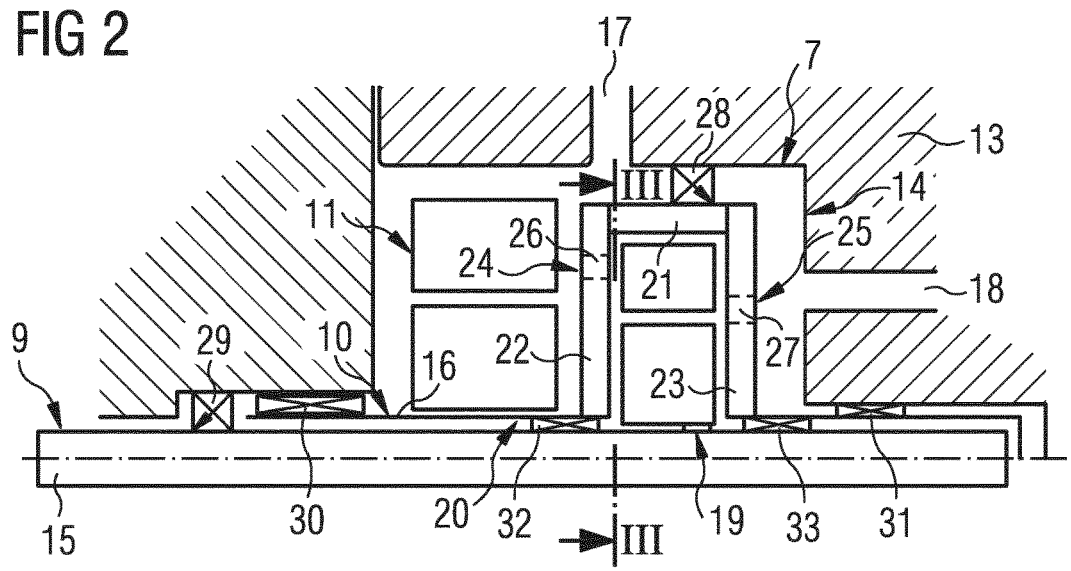
FIG. 2 shows a first embodiment of the pumping device with two drives from FIG. 1.

FIG. 2 shows a sectional illustration through the pumping devise 1 with a part region of the oil pump 7, the electric drive 10 and the direct drive 9 from FIG. 1. It can be seen in FIG. 2 that the oil pump 7 has a stationary housing 13 with a recess 14 for receiving movable components of the oil pump 7 and the electric motor 11 with the electric drive 10. The direct drive 9 has a shaft 15 that is introduced into the recess 14. The electric drive 10 has a hollow shaft 16 arranged completely inside the recess 14 of the housing 13 and encloses the shaft 15 concentrically. In addition, the housing 13 has an inlet connector 17 and an outlet connector 18 of the oil pump 7. A rotor 19 of the oil pump 7 is fastened on the shaft 15. A rotor part 20, which can be rotated with respect to the rotor 19, is fastened on the hollow shaft 16. The rotor part 20 has a ring 21 that encloses the rotor 19 radially and control plates 22, 23, which lie opposite the end sides of the rotor 19, and oil feed elements 24, 25 for the rotor 19. The oil feed elements 24, 25 are configured as inlet opening 26 and as outlet opening 27, respectively. The inlet opening 26 and the outlet opening 27 are arranged, by way of example, in the control plates 22, 23, respectively. As an alternative to this, in the case of a correspondingly designed oil pump 7, the inlet opening 26 and the outlet opening 2 can be arranged in the ring 21 or can be divided between ring 21 and control plates 22, 23. Radial seals 28, 29 seal the shaft 15 and the rotor part 20 with respect to the housing 13. A plurality of bearings 30 to 33 make the rotatable mounting of the hollow shaft 16 possible with respect to the housing 13 and with respect to the shaft 15. The direct drive 9 and the electric drive 10 are of self-locking design, with the result that the rotor part 20 is stationary when the electric drive 10 is switched off and the rotor 19 is stationary when the direct drive 9 is switched off.

If the shaft 15 of the direct drive 9 is rotated, the rotor 19 is rotated with respect to the rotor part 20. In this case, oil is sucked in via the inlet connector 17 and the inlet opening 26 and is pumped via the outlet opening 27 to the outlet connector 18. If the hollow shaft 16 is rotated via the electric drive 10, exclusively the rotor part 20 with the oil feed elements 24, 25 is rotated with respect to the rotor 19. Oil is therefore likewise sucked in via the inlet connector 17 and is pumped to the outlet connector 18 in the housing 13.

Figure 3:
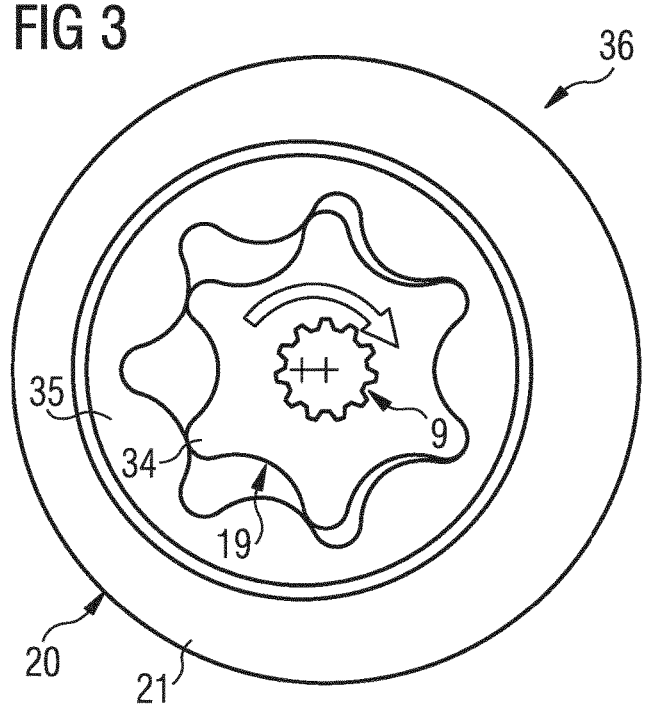
FIG. 3 shows a sectional illustration through the oil pump from FIG. 2 along the line III-III.

In a sectional illustration along the line III-III from FIG. 2, FIG. 3 shows that the oil pump 7 is configured as an annular gear pump 36. An internal rotor 34, which can be driven by the direct drive 9, forms the rotor 19, on which an external rotor 35 rolls. The external rotor 35 is arranged concentrically in the ring 21, which can be driven by the electric drive 10 (shown in FIG. 2). If the ring 21 is rotated via the electric drive 10, the external rotor 35 likewise rolls on the internal rotor 34. In both cases, oil is sucked in via the inlet opening 26 (shown in FIG. 2) in one of the control plates 22 and is pumped to the outlet opening 27 in the other control plate 23.

Figure 4:
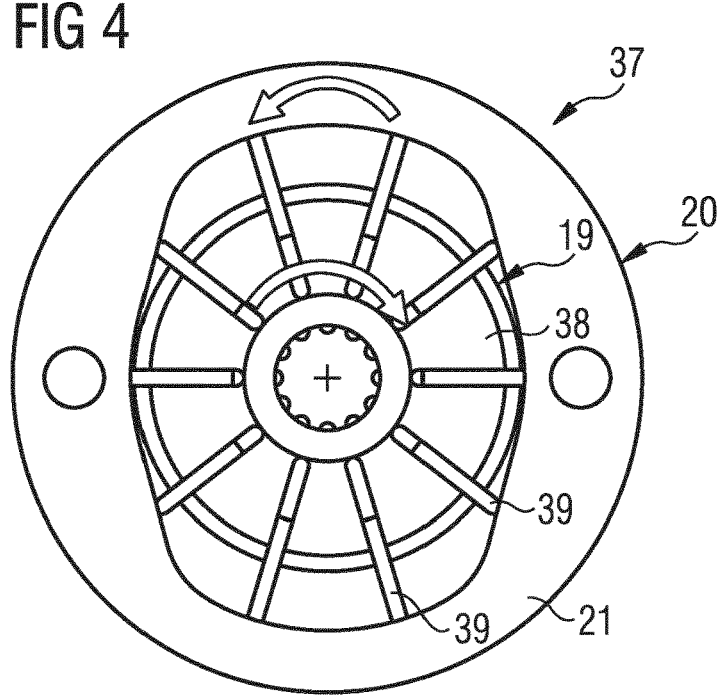
FIG. 4 shows a sectional illustration through a further embodiment of the oil pump.

FIG. 4 shows a further embodiment of the oil pump 7 which differs from that from FIG. 2, above all, in that the oil pump 7 is configured as a vane cell pump 37. Here, the rotor 19 has a rotatable disk 38 with individual vanes 39, which slide along in the ring 21 of the rotor part 20, which ring 21 is of non-round design. As in the preceding embodiments, the ring 21 is connected to the electric drive 10 and the rotor 19 is connected to the direct drive 9.

Figure 5:
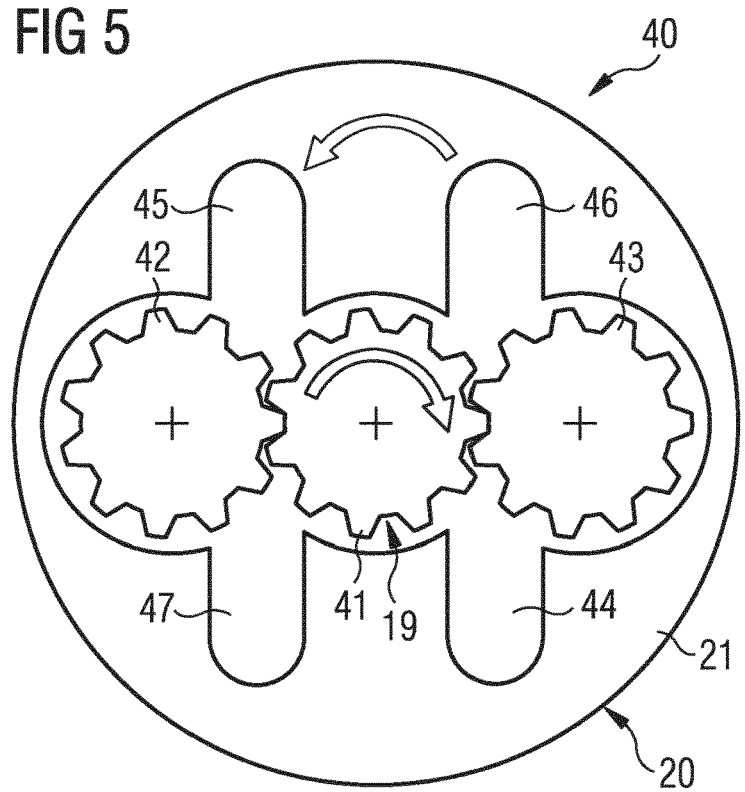
FIG. 5 shows a further embodiment of the oil pump in a sectional illustration.

FIG. 5 shows a further embodiment of the oil pump 7, which differs from that from FIG. 2, above all, in that the oil pump 7 is configured as an external gear pump 40. The rotor 19 has a central gearwheel 41 and drives gearwheels 42, 43, which are mounted on the ring 21 of the rotor part 20. In a provided rotational direction of the gearwheel 41 of the rotor 19 relative to the ring 21 in the clockwise direction, two first ducts 44, 45 lead to the inlet opening 26 (shown in FIG. 2) and two second ducts 46, 47 lead to the outlet opening 27.

Figure 6:
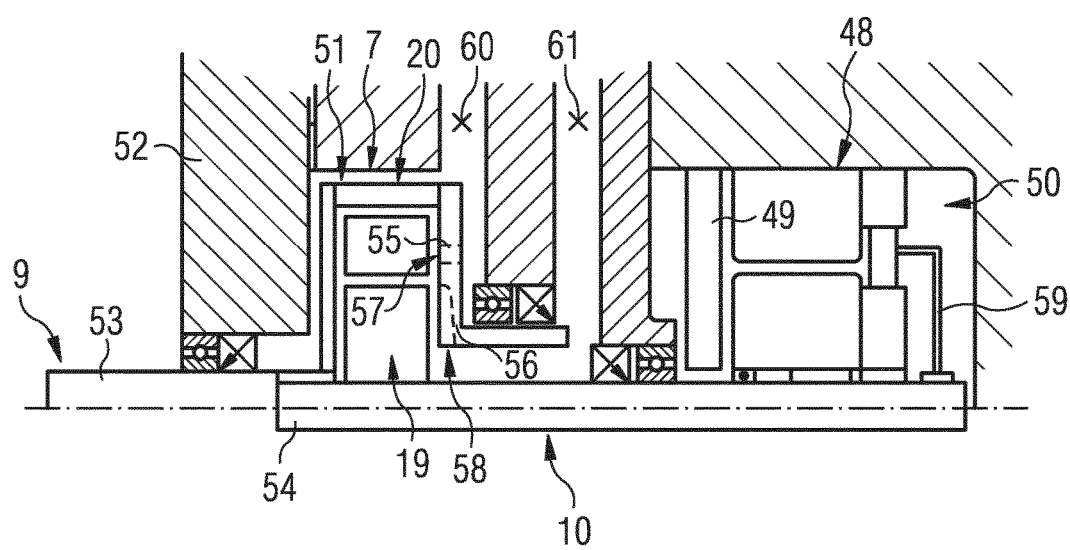
FIG. 6 shows a second embodiment of the pumping device.

FIG. 6 shows a further embodiment of the pumping device 1 with the direct drive 9 and the electric drive 10 of the oil pump 7. The oil pump 7 is constructed as described in FIGS. 3 to 5. This embodiment of the pumping device 1 differs from that described in FIG. 2 in that the oil pump 7 is arranged in a first recess 51 and an electric motor 48 of the electric drive 10 is arranged together with an electronic controller 49 and a step-down gear mechanism 59 in a second recess 50 of a housing 52. Furthermore, the direct drive 9 drives a hollow shaft 53 and the electric drive 10 drives a shaft 54. As in the embodiment described in FIG. 2, the rotor 19 of the oil pump 7 is arranged on the shaft and the rotor part 20 is arranged on the hollow shaft 53. In contrast to the embodiment which is described in FIG. 2, the oil pump is arranged between the direct drive 9 and the electric drive 10. As a result, the oil pump 7 can be connected hydraulically in a very simple manner. As in the embodiment according to FIG. 2, the rotor part 20 has an inlet opening 55 and an outlet opening 56 as oil feed elements 57, 58, respectively, for the rotor 19. The housing 52 has an inlet connector 60 and an outlet connector 61.

The connection of the pumping device 1 to the hybrid drive 2 is to be understood to be merely exemplary. The pumping device 1 is likewise suitable for motor vehicles 12 which are driven exclusively via the internal combustion engine 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pumping device (1) that pumps oil from an oil sump (8) of a motor vehicle (12) to a transmission (4) of the motor vehicle (12), the pumping device (1) comprising:
an oil pump (7) coupled to the oil sump (8) of the motor vehicle (12), the oil pump (7) being selectively drivable to pump oil from the oil sump (8) of the motor vehicle (12) by one or both selected from the group of: (i) a mechanical direct drive (9) of the transmission (4), via a shaft (15, 54); and (ii) a switchable electric drive (10) of an electric motor (11), via a hollow shaft (16, 53), wherein:
the oil pump (7) has a rotatable rotor (19) and a rotor part (20) movable relative to one another to effect pumping of the oil, the rotor part (20) being mounted rotatably with respect to the rotatable rotor (19), and oil feed elements (24, 25, 57, 58) for the rotor (19),
the mechanical direct drive (9) of the transmission (4) is connected to the rotor (19) and the switchable electric drive (10) of the electric motor (11) is connected to the rotor part (20), and
the rotor (19) is fastened on the shaft (15, 54) and the rotor part (20) is connected to the hollow shaft (16, 53), the hollow shaft (16, 53) arranged directly radially adjacent to and enclosing the shaft (15, 54) concentrically.

2. The pumping device as claimed in claim 1, further comprising a stationary housing (13, 52),
wherein:
the rotor part (20) is mounted rotatably with respect to the stationary housing (13, 52) and is sealed by a radial seal (28), and
inlet and outlet connectors (17, 18, 60, 61) configured to provide hydraulic connection of the oil pump (7) are arranged on the housing (13, 52).

3. The pumping device as claimed in claim 2, wherein the stationary housing (13) delimits a common recess (14) in which are arranged the electric motor (11) associated with the electric drive (10) and the rotor part (20) and the rotor (19) of the oil pump (7).

4. The pumping device as claimed in claim 2, wherein the stationary housing (52) delimits:
(a) a first recess (51) in which are arranged the rotor part (20) and the rotor (19) of the oil pump (7), and
(b) a second recess (50) in which is arranged the electric motor (48) of the electric drive (10).

5. The pumping device as claimed in claim 2, wherein the rotor part (20) is configured as an inner housing arranged inside the housing (13, 52) with a ring (21) that encloses the rotor (19) radially and control plates (22, 23) that lie opposite the end sides of the rotor (19).

6. The pumping device as claimed in claim 5, wherein inlet and outlet openings (26, 27, 55, 56) are arranged on the rotor part (20).

7. The pumping device as claimed in claim 6, wherein at least one of the inlet and outlet openings (26, 27, 55, 56) is arranged on the control plates (22, 23) of the rotor part (20).

8. The pumping device as claimed in claim 6, wherein at least one of the inlet and outlet openings (26, 27, 55, 56) is arranged on the ring (21) of the rotor part (20), which ring (21) encloses the rotor (19).

9. The pumping device as claimed in claim 1, wherein the electric drive (10) has a step-down gear mechanism (59).

10. The pumping device as claimed in claim 1, wherein the direct drive (9) and the electric drive (10) are of self-locking design.

11. The pumping device as claimed in claim 1, wherein the oil pump (7) is configured as an annular gear pump (36), as a vane cell pump (37) or as an external gear pump (40).

* * * * *